United States Patent
Savakkanavar

(10) Patent No.: US 11,604,004 B2
(45) Date of Patent: Mar. 14, 2023

(54) METHOD AND SYSTEM TO MEASURE AND CONTROL INDOOR ENVIRONMENT USING IOT AND AI

(71) Applicant: Prakash Savakkanavar, Bangalore (IN)

(72) Inventor: Prakash Savakkanavar, Bangalore (IN)

( * ) Notice: Subject to any disclaimer, the term of this patent is extended or adjusted under 35 U.S.C. 154(b) by 363 days.

(21) Appl. No.: 16/632,183

(22) PCT Filed: Dec. 26, 2019

(86) PCT No.: PCT/IN2019/050958
§ 371 (c)(1),
(2) Date: Jan. 17, 2020

(87) PCT Pub. No.: WO2021/130759
PCT Pub. Date: Jul. 1, 2021

(65) Prior Publication Data
US 2021/0364184 A1    Nov. 25, 2021

(51) Int. Cl.
*F24F 11/63* (2018.01)
*F24F 11/72* (2018.01)
*F24F 11/58* (2018.01)
*F24F 8/10* (2021.01)
*G05B 19/042* (2006.01)
*F24F 110/50* (2018.01)
(Continued)

(52) U.S. Cl.
CPC ............... *F24F 11/63* (2018.01); *F24F 8/10* (2021.01); *F24F 11/58* (2018.01); *F24F 11/72* (2018.01); *G05B 19/042* (2013.01); *F24F 2110/12* (2018.01); *F24F 2110/50* (2018.01); *F24F 2110/52* (2018.01); *G05B 2219/2614* (2013.01)

(58) Field of Classification Search
CPC .. F24F 11/63; F24F 11/72; F24F 11/58; F24F 8/10; F24F 2110/50; F24F 2110/12; F24F 2110/52
USPC ........................................................ 700/276
See application file for complete search history.

(56) References Cited

U.S. PATENT DOCUMENTS

| | | | |
|---|---|---|---|
| 6,711,470 B1 * | 3/2004 | Hartenstein | F24F 11/30 |
| | | | 700/276 |
| 2004/0133314 A1 * | 7/2004 | Ehlers | G06Q 10/10 |
| | | | 700/276 |
| 2004/0162016 A1 | 8/2004 | Urbank et al. | |

(Continued)

FOREIGN PATENT DOCUMENTS

IN        323656        11/2012

*Primary Examiner* — Md Azad
(74) *Attorney, Agent, or Firm* — Oliff PLC

(57) ABSTRACT

A method and a system to measure and control indoor environment using Internet of Things (IoT) and Artificial Intelligence (AI) or Strong Artificial Intelligence (SAI). The method includes the steps of measuring air quality of an indoor environment and/or outdoor environment using respective sensors and/or analyzers, followed by receiving, configuring and controlling the data, by the processor, to maintain the indoor air quality using healthy gas stored in the container(s) and using air conditioned unit to achieve the user desired indoor air quality parameters. Further, a system for measuring and controlling air quality in an indoor environment as desired by the user. The user can even customize the parameters to achieve desired air quality in the indoor environment.

10 Claims, 3 Drawing Sheets

(51) Int. Cl.
    *F24F 110/12*     (2018.01)
    *F24F 110/52*     (2018.01)

(56) References Cited

U.S. PATENT DOCUMENTS

| | | |
|---|---|---|
| 2005/0053515 A1 | 3/2005 | Yates et al. |
| 2007/0243808 A1 | 10/2007 | Mathur et al. |
| 2013/0160767 A1* | 6/2013 | Abella .................. A62B 7/02 128/204.22 |
| 2016/0116181 A1* | 4/2016 | Aultman ............... F24F 11/70 700/276 |
| 2018/0119973 A1* | 5/2018 | Rothman ............... F24F 11/30 |
| 2020/0003447 A1* | 1/2020 | Lee ....................... F24F 11/65 |
| 2021/0003310 A1* | 1/2021 | Shnaiderman ......... F24F 11/62 |
| 2021/0018212 A1* | 1/2021 | Prisikar ................. F24F 11/46 |

\* cited by examiner

METHOD AND SYSTEM TO MEASURE AND CONTROL INDOOR ENVIRONMENT USING IOT AND AI

TECHNICAL FIELD

The present disclosure relates generally to smart devices and systems using Internet-of-Things ("IoT")-related technology. More particularly, the present disclosure relates to a method and system for accurately measuring and controlling air quality of indoor environment using IoT technology and Artificial Intelligence.

BACKGROUND

The term "air quality" indicates the state of the air in a given environment. Good air quality typically refers to "clean," i.e., unpolluted, air. Clean air is essential for the health of humans, wildlife, vegetation, water and soil. Poor air quality may be the result of a number of factors, including emissions from various sources, including natural and human-caused emissions. For example, automobile, fossil fuel burning and livestock emissions can all have a significant effect on air quality. Poor air quality occurs when pollutants reach sufficiently significant concentrations to endanger or adversely impact human health or the environment. The level of comfort offered to a commercial or residential occupant is an important aspect of Liveability. The key factors that influence comfort can range from the environmental temperature set by a Heating, Ventilation, and Air Conditioning (HVAC) system to the Indoor Air Quality (IAQ). Serious threats to health include carbon monoxide, sulphur dioxide, nitrogen dioxide, particulate matter and other organic compounds. Hence, a comfort level of a residential structure or commercial building can have a significant impact on the health of the occupants. As people typically spend more than 90% of their time in indoor environments, health problems and diseases caused by poor IAQ can negatively affect livability and or Quality of Life (QoL). IAQ is an imperative variable that requires control for occupants☐ health, well-being, comfort, and ultimately QoL.

Typically, quality of air in an indoor environment such as within a home is measured based on the health and comfort of those living inside. Common factors that affect IAQ are carbon monoxide (CO), carbon dioxide ($CO_2$), Nitrogen dioxide ($NO_2$), Volatile Organic Compounds (VOCs), Lead particles, mold, allergens, secondhand smoke (Benzene, Tobacco specific nitrosamines, Benzopyrene, Butadiene, Cadmium, Formaldehyde and Acetaldehyde) and other harmful airborne particulates and gases. The above gases, airborne particulates, etc., can originate from a number of common household devices, furnishings, items, etc. Turning now to IoT, it is global network infrastructure, linking physical and virtual objects through the exploitation of data capture and communication capabilities. IoT is the connection of intelligent machines, fitted with a growing number of electronic sensors, via a network. IoT devices are generally constrained devices with limited computation and communication abilities. IoT is also a web-enabled data logging and data exchange that allows systems with more capacities to become smart and accessible, creating webs of objects and allowing integration of data, services and components. Smart objects, such as smart phones and smart watches, employing sensors that perform activity recognition and detect physical activities such as walking, running, climbing stairs, descending stairs, driving, cycling, can be considered IoT devices as well in the context of communication protocols. Currently, HVAC system doesn☐t include the monitoring of personal measurement data to assess or monitor the environmental effects on an occupant of a hospital, care facility, commercial or residential home, along with the customary function of measuring and controlling air quality to create comfortable and healthy environments. In light of the above, there is a strong need in the art to accurately measure air quality of indoor environment and control the air quality so as to improve indoor air quality and livability of subjects (human beings or animals).

SUMMARY

The following presents a simplified summary of some embodiments of the invention in order to provide a basic understanding of the disclosure. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later. Embodiments of the present disclosure provide a system, and a method of measuring and controlling air quality in an indoor environment and that avoids the drawback of known techniques.

In order to achieve the object, the present disclosure provides a system that is configured to measure and control air quality in an indoor environment using IoT and Artificial Intelligence or Strong Artificial Intelligence. In order to measure air quality, the system is communicatively connected to a plurality of indoor sensors and an indoor air sample analyzer placed in an indoor environment. Additionally, the system is communicatively connected to external sensors, an outdoor air sample analyzer, an environment server, an outdoor temperature sensor, and an outdoor healthy air sensor, for measuring air quality data of an outdoor environment. Further, the system might be configured to obtain desired indoor air quality parameters. The desired indoor air quality parameters might be obtained based on the air quality data received from the indoor environment and outdoor environment.

The system might be used to control operation of the plurality of indoor filters, the healthy gas storage container, and the air conditioned unit to achieve the desired indoor air quality parameters based on the air quality data of the indoor environment.

In one implementation, the system is used to control the operation of the plurality of indoor filters/outdoor filters, the healthy gas storage container or the healthy gas extracted from natural air, and the air conditioned unit to achieve the desired indoor air quality parameters based on the air quality data of the indoor and outdoor environment based on instructions received from a user device.

In another implementation, the system might learn the pattern of settings received over a period of time control the operation of the plurality of indoor filters, the healthy gas storage container, and the air conditioned unit to achieve the desired indoor air quality parameters based on the air quality data of the indoor and outdoor environment. It should be understood that the system automatically controls the IAQ parameters of the indoor environment, by learning the pattern of the IAQ parameters measured and set desired IAQ parameters using Artificial Intelligence (AI) or Strong Artificial Intelligence (SAI).

In yet another implementation, the system might be operated using display provided at the system or using a remote control to provide instructions to control the operation of the plurality of indoor filters, the healthy gas storage container, and the air conditioned unit to achieve the desired indoor air quality parameters based on the air quality data of the indoor and outdoor environment. The system helps to achieve desired effect in the indoor environment and can be used for providing clean/fresh air in the indoor environment. It also creates the desired indoor environment.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
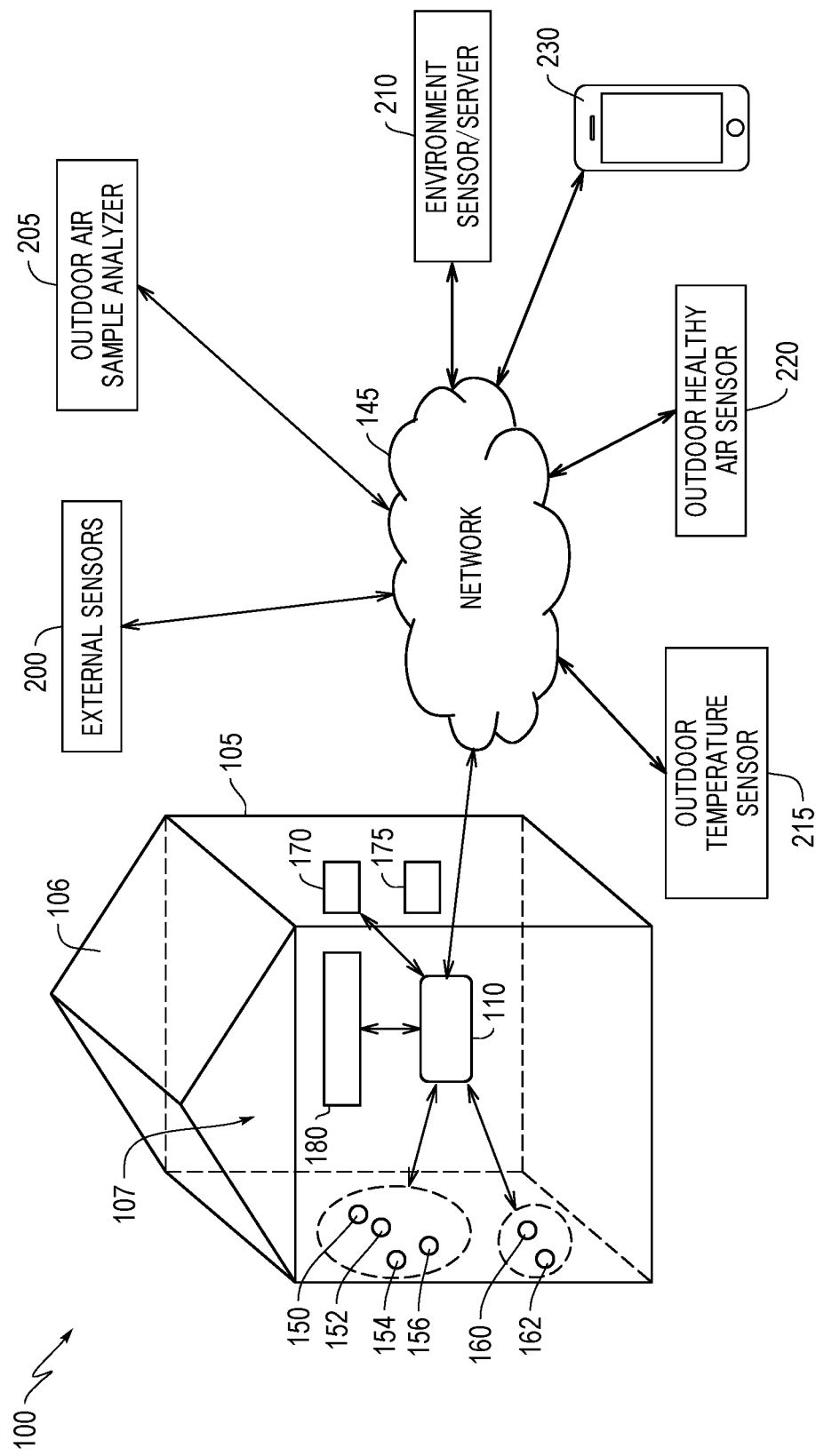
FIG. 1 illustrates an environment 100 in which a system 110 for measuring and controlling air quality in an indoor environment is implemented, in accordance with one embodiment of present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

Before explaining any one embodiment of the present disclosure by way of drawings, experimentation, results, and pertinent procedures, it is to be understood that the disclosure is not limited in its application to the details as explained in below embodiments set forth in the following description or illustrated in the drawings, experimentation and/or results. The disclosure is further capable of other embodiments which can be practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

In the present document, the word "exemplary" is used herein to mean "serving as an example, instance, or illustration." Any embodiment or implementation of the present subject matter described herein as "exemplary" is not necessarily to be construed as preferred or advantageous over other embodiments. Moreover, certain terminology is used in the following description for convenience only and is not limiting. For example, the words "right," "left,", □top□, □bottom□, "inner" and "outer" designate directions in the drawings to which reference is made. The word "a" is defined to mean "at least one." The terminology includes the words above specifically mentioned, derivatives thereof, and words of similar import.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms □comprises□, □comprising□, or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by □comprises . . . a□ does not, without more constraints, preclude the existence of other elements or additional elements in the system or method.

The term 'Sensor' shall mean Sensor(s) per se or Micro sensors either isolated or combined. In the present disclosure source of Oxygen shall mean Oxygen condenser or Oxygen stored in a cylinder either indoor or outdoor. Similarly, source of Nitrogen shall mean Nitrogen generator or Nitrogen stored in a cylinder either indoor or outdoor. The indoor filters of the present disclosure are either isolated or communicating with outdoor filter or vice versa and accordingly air can be brought to indoor from outdoor if indoor air quality is not good.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

It should be understood that the present disclosure describes a system, and a method of measuring and controlling air quality in an indoor environment. Various features and embodiments of the system for measuring and controlling air quality in an indoor environment are explained in conjunction with the description of FIGS. 1-4.

In one embodiment, the present disclosure discloses a system for measuring and controlling air quality of an indoor environment through intelligent operation of the system and automatically adjustable equipment in the system to improve indoor air quality. FIG. 1 shows an environment 100 in which a system 110 is implemented. The environment 100 comprises the system 110, a plurality of indoor sensors 150, 152, 154, 156, a plurality of indoor filters 160, 162, an indoor air sample analyser 170, a healthy gas storage container 175, an air conditioned unit 180, external sensors 200, an outdoor air sample analyser 205, an environment sensor/server 210, an outdoor temperature sensor 215, an outdoor healthy air sensor 220, and a user device 230. Each of the system 110, the plurality of indoor sensors 150, 152, 154, 156, the plurality of indoor filters 160, 162, the indoor air sample analyser 170, the healthy gas storage container 175, the air conditioned unit 180, the external sensors 200, the outdoor air sample analyser 205, the environment sensor/server 210, the outdoor temperature sensor 215, the outdoor healthy air sensor 220, and the user device 230 wirelessly communicate with other devices thus forming a part of Internet of Things (IoT) devices.

The system 110 might include a server or a computer or a laptop, a smart phone or any electronic device comprising an application to execute functions for measuring air quality of indoor environment and controlling the air quality. In alternative embodiments, the system 110 operates as a standalone device or may be connected (e.g., networked) to other systems. Further, it should be understood that the system 110 might be implemented in any different computing systems, environments, and/or configurations such as a workstation, an electronic device, a mainframe computer, a laptop, and so on.

The system 110 might indicate an Indoor Air Quality (IAQ) control hub configured to aggregate data regarding indoor and outdoor air quality and to control the air quality in an indoor environment 107. As can be seen in FIG. 1, the environment 100 includes a building/house/room or they could be transport vehicles—air, road and water 105 having an outdoor environment 106 and the indoor environment 107. The system 110 might be installed in the indoor environment 107 of the building 105. The system 110 might be housed in an enclosure that might be wall mounted or otherwise positioned within the building 105.

Figure 2:
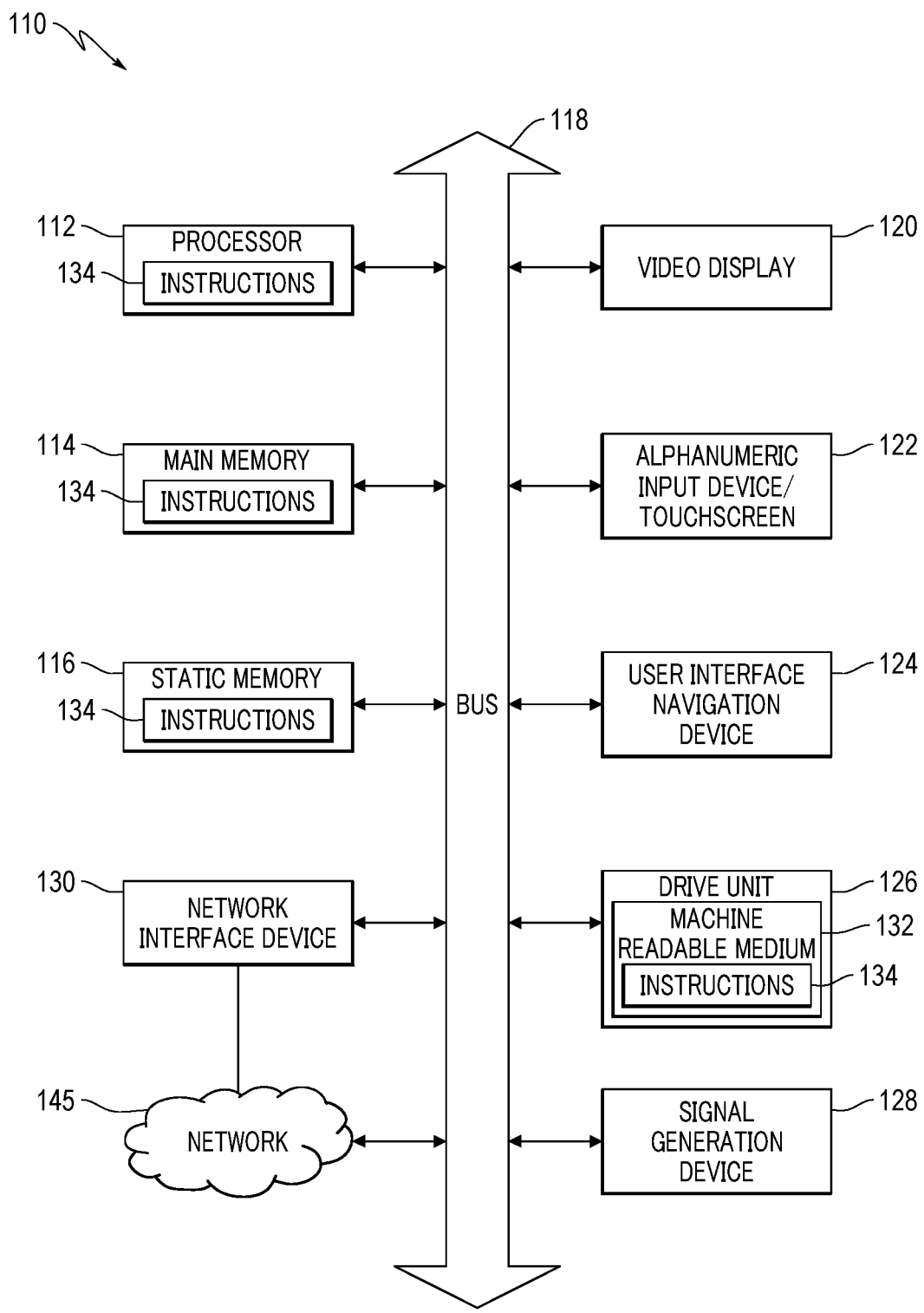
FIG. 2 illustrates a diagrammatic representation of the system 110, in accordance with one embodiment of present disclosure.
Figure 3:
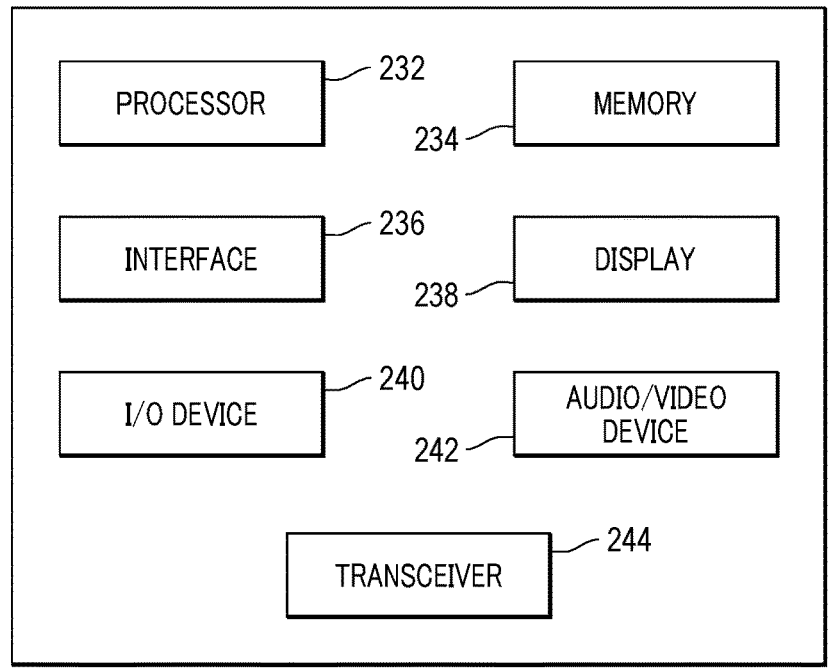
FIG. 3 illustrates a block diagram of a user device 230, in accordance with one embodiment of the disclosure.

Referring to FIG. 2, a diagrammatic representation of the system 110 is shown, in accordance with one embodiment of present disclosure. The system 110 comprises a processor 112 (e.g., a central processing unit (CPU), a graphics processing unit (GPU) or both), a main memory 114 and a static memory 116, which communicate with at least one other via a bus 118. The system 110 may further include a video display unit 120 (e.g., a Liquid Crystal Display (LCD) or a Cathode Ray Tube (CRT)). The system 110 further includes an alphanumeric input device (e.g., a keyboard) and/or a touch screen 122, a user interface (UI) navigation device 124 (e.g., a mouse), a disk drive unit 126, a signal generation device 128 (e.g., a speaker) and a network interface device 130.

The disk drive unit 126 includes a machine-readable media 132 on which is stored one or more sets of instructions and data structures (e.g., software 134) embodying or utilized by any one or more of the methodologies or functions described herein. It should be understood that the term ☐machine-readable media☐ might be taken to include a single media or multiple media (e.g., a centralized or distributed database, and/or associated caches and servers) that store the one or more sets of instructions. The term ☐machine-readable media☐ may also be taken to include any media that is capable of storing, encoding or carrying a set of instructions for execution by the machine and that cause the machine to perform any one or more of the methodologies of the present disclosure, or that is capable of storing, encoding or carrying data structures utilized by or associated with such a set of instructions. The term ☐machine-readable media☐ may accordingly be taken to include, but not be limited to, solid-state memories, optical and magnetic media, and carrier wave signals.

The instructions 134 may also reside, completely or at least partially, within the main memory 114 and/or within the processor 112 during execution thereof by the system 110, the main memory 114 and the processor 112 also constituting machine-readable media. The instructions 134 may further be transmitted or received over the network 145 via the network interface device 130 utilizing any one of a number of well-known transfer protocols. The network 145 may be a wireless network, a wired network or a combination thereof. The network 145 can be implemented as one of the different types of networks, such as intranet, Local Area Network (LAN), Wide Area Network (WAN), Personal Area Network (PAN), any other known networks in the public domain, the internet, and the like. The network 145 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 145 may include a variety of network devices, including routers, bridges, servers, computing devices, storage devices, and the like.

It should be understood that the system 110 might be used as a computing device such as a desktop, a laptop, or any other electronic device configured for determining various control parameters and issuing control commands. As such, the system 110 might receive IAQ data from sensors and other sources as well as transmit IAQ control commands.

Referring to FIG. 1, the system 110 might be communicatively coupled to the indoor sensors 150, 152, 154, and 156. In one example, the indoor sensor 150 may indicate a sensor configured for measuring the amount of at least one or more volatile organic compounds (☐VOCs☐), carbon dioxide, carbon monoxide, methane gas, or a combination thereof in the air, and wherein the solid particles and/or liquid droplets are mold spores, bacteria, dust mites, dust, PM2.5, insect faeces, pollen, smoke, dander, saliva, mucus, other airborne allergens, or a combination thereof.

In one example, the indoor sensor 152 may indicate a sensor configured for sensing parameter that can affect IAQ parameters. For example, the indoor sensor 154 may include occupancy sensors, activity sensors, sunlight sensors, ground-moisture sensors, and so on.

In one example, the indoor sensor 154 may indicate a sensor configured for sensing air temperature, air humidity, air pressure, amount of airflow, or a combination thereof the indoor environment 107.

In one example, the indoor sensor 156 may indicate a sensor configured for sensing measuring the amount of solid particles and/or liquid droplets in the air.

It should be understood the plurality of indoor sensors 150, 152, 154, and 156 explained herein are not restricted to the parameters listed above, the plurality of indoor sensors 150, 152, 154, and 156 might be used for measuring other parameters that might effect IAQ in the indoor environment 107.

Further, the system 110 is communicatively coupled to the plurality of indoor filters 160, 162. In one example, the indoor filter 160 might indicate a filter/screen configured for stopping or filtering molecules, and other particles from the air. Optionally, the indoor filter 160 might indicate a filter e.g., electrostatic precipitator that can be used to remove fine particles like dust and smoke from gas.

The indoor filter 162 might indicate a filter configured for removing odour of cigarettes or the like odour, resulting in some of the indoor air purification effect.

The indoor air sample analyser 170 might indicate a sensor or unit configured for determining parameters associated with air quality in the indoor environment 107.

The healthy gas storage container 175 might indicate a chamber or container storing healthy gases for safe breathing of air by human beings. The healthy gas storage container 175 might be used to store oxygen and nitrogen or any other gases.

The air-conditioned unit 180 might indicate an air modification device such as a fan or air conditioner as known in the art. The air-conditioned unit 180 might be used for supplying or controlling airflow in the indoor environment 107. The air-conditioned unit 180 might be used for supplying air in desired direction in the indoor environment 107, e.g., the air can be supplied to either left or right or top or bottom or combination thereof or in all directions to achieve the desired IAQ parameters.

The external sensors 200 might include sensors placed in the outdoor environment 106 that are communicatively connected to the system 110 via the network 145. In one example, the external sensors 200 might indicate sensors configured for measuring the amount of at least one or more volatile organic compounds (□VOCs□), carbon dioxide, carbon monoxide, methane gas, or a combination thereof in the air, and wherein the solid particles and/or liquid droplets are mold spores, bacteria, dust mites, dust, PM2.5, insect faeces, pollen, smoke, dander, saliva, mucus, other airborne allergens, or a combination thereof. In another example, the external sensors 200 might indicate sensors configured for sensing measuring the amount of solid particles and/or liquid droplets in the air.

The outdoor air sample analyser 205 might indicate a sensor or unit configured for determining parameters associated with air quality.

The environment sensor/server 210 might indicate a sensor or server used by an institution such as research centre or government body for sensing and alerting human beings of important events such as earthquakes, crop burning, smog, smoke and so on based on air direction of air, season, climate change and so on. The environment sensor/server 210 might be configured to receive and store the indoor air quality.

The outdoor temperature sensor 215 might indicate a sensor configured sensing air temperature in the outdoor environment 106.

The outdoor healthy air sensor 220 might indicate a sensor or unit configured for determining parameters associated with air quality in the outdoor environment 106.

The user device 230 might include, but not limited to, a mobile phone, a laptop, a desktop computer, a tablet, a wristwatch and other electronic devices. The user device 230 may include at least one processor 232. The at least one processor 232 may include one or more commonly known CPUs such as microprocessor or microcontroller. It should be understood that the at least one processor 232 might be responsible for implementing specific functions under the control of software including an operating system, and any appropriate applications software.

The user device 230 may include a memory 234 such as a volatile memory (e.g., RAM), non-volatile memory (e.g., disk memory, FLASH memory, EPROMs, etc.), unalterable memory, and/or other types of memory. In one implementation, the memory 234 might be configured or designed to store data, program instructions. The program instructions might control the operation of an operating system and/or one or more application.

The user device 230 may include interface(s) 236. The interface 236 may include wired interfaces and/or wireless interfaces. In at least one implementation, the interface(s) 236 may include functionality similar to at least a portion of functionality implemented by one or more computer system interfaces such as those described herein and/or generally known to one having ordinary skill in the art.

The user device 230 may include display(s) 238. The display(s) 238 may be implemented using LCD display technology, OLED display technology, and/or other types of conventional di splay technology.

The user device 230 may include one or more user I/O Device(s) 240. The one or more user I/O Device(s) 240 may include keys, buttons, scroll wheels, cursors, touch screen sensors, audio command interfaces, magnetic strip reader, optical scanner, etc.

The user device 230 may include Audio/Video device(s) 242. The Audio/Video device(s) 242 includes components for displaying audio/visual media. For example, the Audio/Video device(s) 242 may include cameras, speakers, microphones, media presentation components, wireless transmitter/receiver devices for enabling wireless audio and/or visual communication between the user device 230 and the system 110 and other remote devices (e.g., radios, telephones, computer systems, etc.).

The user device 230 may include wireless communication module(s)/transceiver 244. The transceiver 244 may be configured to communicate with external devices using one or more wireless interfaces/protocols such as, for example, 802.11 (Wi-Fi), 802.15 (including Bluetooth□), 802.16 (Wi-Max), 802.22, Cellular standards such as CDMA, CDMA2000, WCDMA, Radio Frequency (e.g., RFID), Infrared, Near Field Magnetics, etc.

It should be understood that each of the system 110, the plurality of indoor sensors 150, 152, 154, 156, the plurality of indoor filters 160, 162, the indoor air sample analyser 170, the healthy gas storage container 175, the air conditioned unit 180, the external sensors 200, the outdoor air sample analyser 205, the environment sensor/server 210, the outdoor temperature sensor 215, the outdoor healthy air sensor 220, and the user device 230 communicate with each other wirelessly in an Internet of Things (IoT) fashion for measuring and controlling air quality in the indoor environment 107.

In order to measure the indoor air quality (IAQ) of the indoor environment 107, the system 110 might receive data from each of the plurality of indoor sensors 150, 152, 154, 156, the indoor air sample analyser 170, the healthy gas storage container 175, the air conditioned unit 180, the external sensors 200, the outdoor air sample analyser 205, the environment sensor/server 210, the outdoor temperature sensor 215, and the outdoor healthy air sensor 220, and the user device 230. For example, the system 110 might receive data corresponding to IAQ such as air temperature, air pressure, humidity, VOC, and PM from the plurality of indoor sensors 150, 152, 154, 156. After receiving the IAQ data, the system 110 might transmit the data to the user device 230.

In accordance with one embodiment of the present disclosure, the system 110 might be used to control IAQ of the indoor environment 106 from the user device 230, or automatically by the system 110 based on the air quality data received from the plurality of indoor sensors 150, 152, 154, 156, the indoor air sample analyser 170, the healthy gas storage container 175, the air conditioned unit 180, the external sensors 200, the outdoor air sample analyser 205, the environment sensor/server 210, the outdoor temperature sensor 215, and the outdoor healthy air sensor 220.

In order to explain the embodiment where the user device 230 might be used to control IAQ of the indoor environment 106, an example might be used. It should be understood that the current example is presented only to illustrate one way of using the user device 230 to control the IAQ of the indoor environment 106, other examples depicting similar scenarios also fall within the scope of the present disclosure.

In one example, consider that the air temperature in the indoor environment 107 is 29° C. Further, consider that the indoor environment 107 includes smoke. As explained above, each of the plurality of indoor sensors 150, 152, 154, 156, the indoor air sample analyser 170, the healthy gas storage container 175, the air-conditioned unit 180 might sense the IAQ parameters and transmit to the system 110. Further, the system 110 might transmit the IAQ parameters to the user device 230. The user device 230 might be used to determine that the air temperature be reduced to 23° C. and the smoke is cleared using the indoor filters 160, 162 and further, the odour of the indoor environment be changed by introducing fragrance into the indoor environment 107. Based on the instructions received from the user device 230, the system 110 might instruct the indoor air sample analyser 170 to analyse the IAQ parameters. Subsequently, the system 110 might instruct the healthy gas storage container 175 to release healthy gases in desired concentration so to introduce oxygen in the indoor environment 107. Further, the system 110 might instruct the air-conditioned unit 180 to pump cooler air so as to bring down the air temperature to 23° C. The system 110 may continuously communicate and instruct the plurality of indoor sensors 150, 152, 154, 156, the indoor air sample analyser 170, the healthy gas storage container 175, the air conditioned unit 180 until the desired IAQ parameters set using the system 110 are achieved thus controlling each of the plurality of indoor sensors 150, 152, 154, 156, the indoor air sample analyser 170, the healthy gas storage container 175, and the air conditioned unit 180 to achieve the desired IAQ.

In one exemplary implementation, the system 110 might communicate with the external sensors 200, the outdoor air sample analyser 205, the environment sensor/server 210, the outdoor temperature sensor 215, and the outdoor healthy air sensor 220 to obtain air quality parameters in the outdoor environment 106. The system 110 communicates with the external sensors 200, the outdoor air sample analyser 205, the environment sensor/server 210, the outdoor temperature sensor 215, and the outdoor healthy air sensor 220 such that the system 110 might use minimum resources and save energy consumption in operating the healthy gas storage container 175, and the air conditioned unit 180 so as to control the IAQ as desired in a shorter time.

In one exemplary embodiment, the user of the user device 230 might instruct the system 110 to create an environment of a forest area (Example: Amazon forest fresh air)—forest climate customisation—in the indoor environment. The forest environment might indicate clean air with minimum to no pollution, appropriate humidity/moisture, temperature, fragrance (healthy gas in suitable proportions) and/or with any pleasant odour of the forest. As such, the system 110 might instruct the healthy gas storage container 175, the air conditioned unit 180 and might use data from the outdoor air sample analyser 205, the environment sensor/server 210, the outdoor temperature sensor 215, and the outdoor healthy air sensor 220 to control the air quality in the indoor environment 107 such that indoor environment is made to appear like a forest environment.

In another exemplary embodiment, the system 110 might learn the instructions received from the user device 230 or might learn the pattern of the IAQ parameters measured in the indoor environment 107 over a period of time based on the indoor and outdoor air quality data obtained from the sensors and automatically control the IAQ parameters of the indoor environment without the need of the user device 230 to set desired IAQ parameters. In order to automatically control the IAQ parameters of the indoor environment 107, the system 110 might learn the pattern of the IAQ parameters measured and set desired IAQ parameters using artificial intelligence (AI). Specifically, the system 110 might learn the pattern of the IAQ parameters measured and set desired IAQ parameters automatically monitor air quality, air pollutant signatures, and thermal comfort levels in real-time. In addition, based on a mathematical classifier (i.e., algorithm) trained on a supervised machine-learning method (such as SVM), the system 110 might automatically turn on/off, power up/down and/or open/close the healthy gas storage container 175, the air conditioned unit 180 and operate the plurality of indoor filters 160, 162, according to different air-related data measured in real-time using the plurality of indoor sensors 150, 152, 154, 156, the indoor air sample analyser 170, the healthy gas storage container 175, the air conditioned unit 180, the external sensors 200, the outdoor air sample analyser 205, the environment sensor/server 210, the outdoor temperature sensor 215, and the outdoor healthy air sensor 220 to control the air quality of the indoor environment 107.

The algorithm might be tailored to each user's unique environment and personal tolerance levels of air quality measures. In one embodiment, it is desirable to implement this algorithm in the system 110 with low CPU clock speed, the algorithm can be built using linear classifiers, which can prioritize computational speed over accuracy. In another embodiment, if it can tolerate slight delays in the response time of the system 110, then the algorithm built with non-linear classifiers can be deployed in the environment sensor/server 210, which can prioritize accuracy over speed.

Figure 4:
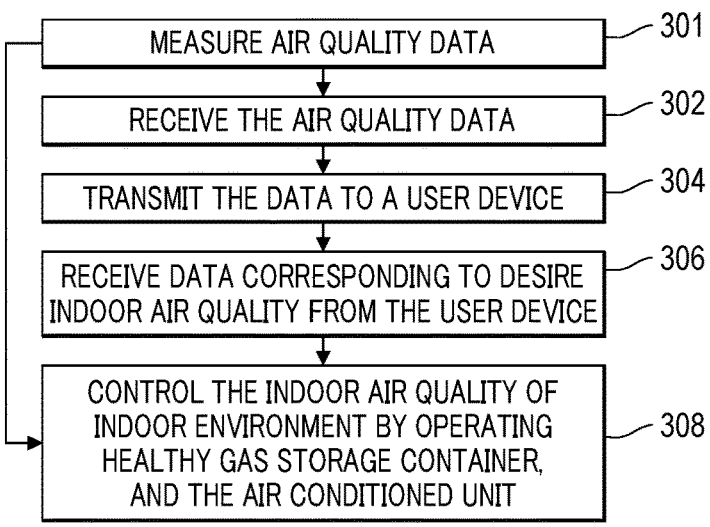
FIG. 4 illustrates a method 300 of measuring and controlling air quality in an indoor environment, in accordance with one embodiment of the disclosure.

Now referring to FIG. 4, a method 300 of measuring and controlling air quality in an indoor environment is explained, in accordance with one embodiment of the present disclosure. The method 300 is presented to explain documentation of a sequence of steps involved in storing, using, reprocessing the endoscopes. The order in which the method 300 of measuring and controlling air quality in an indoor environment is described should not be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 might be implemented using the above-described system 110.

The method 300 comprising sequence of steps are performed for measuring and controlling air quality in an indoor environment with the help of the system 110, the plurality of indoor sensors 150, 152, 154, 156, the plurality of indoor filters 160, 162, the indoor air sample analyser 170, the healthy gas storage container 175, the air conditioned unit 180, the external sensors 200, the outdoor air sample analyser 205, the environment sensor/server 210, the outdoor temperature sensor 215, and the outdoor healthy air sensor 220.

At step 301, the plurality of indoor sensors 150, 152, 154, 156, and the indoor air sample analyser 170 measures air quality data.

At step 302, the system 110 might receive the air quality data from the plurality of indoor sensors 150, 152, 154, 156, the plurality of indoor filters 160, 162, the indoor air sample analyser 170, the healthy gas storage container 175, the air conditioned unit 180, the external sensors 200, the outdoor air sample analyser 205, the environment sensor/server 210, the outdoor temperature sensor 215, and the outdoor healthy air sensor 220.

At step 304, the system 110 might transmit the data to the user device 230.

At step 306, the user device 230 might be used to configure desired IAQ parameters in the indoor environment 107.

At step 308, the system 110 receives the instructions from the user device 230 and controls the plurality of indoor filters 160, 162, the healthy gas storage container 175, and the air conditioned unit 180 to achieve the desired IAQ parameters set using the user device 230. At the time of controlling the healthy gas storage container 175, and the air conditioned unit 180, the system 110 continuously receives the IAQ parameters from the plurality of indoor sensors 150, 152, 154, 156, the plurality of indoor filters 160, 162, the indoor air sample analyser 170, the external sensors 200, the outdoor air sample analyser 205, the environment sensor/server 210, the outdoor temperature sensor 215, and the outdoor healthy air sensor 220 and accordingly operates the plurality of indoor filters 160, 162, the healthy gas storage container 175, and the air conditioned unit 180.

The system helps to achieve desired effect in the indoor environment and can be used for providing clean/fresh air in the indoor environment. Further, the system helps to measures taken in emergency situations such as during earthquake, fire, electrocution and accordingly control the indoor environment to supply clean air and to reduce indoor pollution.

The system might be configured to learn the pattern of settings received over a period of time control the operation of the plurality of indoor filters, the healthy gas storage container, and the air conditioned unit to achieve the desired indoor air quality parameters based on the air quality data of the indoor and outdoor environment. It should be understood that the system automatically controls the IAQ parameters of the indoor environment, by learning the pattern of the IAQ parameters measured and set desired IAQ parameters using Artificial Intelligence (AI) or Strong Artificial Intelligence (SAI).

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Environment |
| 105 | Building |
| 106 | Outdoor Environment |
| 107 | Indoor Environment |
| 110 | System |
| 112 | Processor |
| 114 | Main Memory |
| 116 | Static Memory |
| 118 | Bus |
| 120 | Video Display Unit |
| 122 | Alphanumeric Input Device and/or Touch screen |
| 124 | User Interface (UI) Navigation Device |
| 126 | Disk Drive Unit |
| 128 | Signal Generation Device |
| 130 | Network Interface Device |
| 132 | Machine-Readable Media |
| 134 | Instructions |
| 145 | Network |
| 150, 152, 154, 156 | Indoor Sensors |
| 160, 162 | Indoor Filters |
| 170 | Indoor Air Sample Analyzer |
| 175 | Indoor/Outdoor Healthy Gas Storage Container |
| 180 | Air Conditioned Unit |
| 200 | External Sensors |
| 205 | Outdoor Air Sample Analyzer |
| 210 | Environment Sensor/Server |
| 215 | Outdoor Temperature Sensor |
| 220 | Outdoor Healthy Air Sensor |
| 230 | User Device |
| 232 | Processor |
| 234 | Memory |
| 236 | Interface |
| 238 | Display |
| 240 | I/O Device |
| 242 | Audio/Video device |
| 244 | Transceiver |
| 300 | Method |

I claim:
1. A method for measuring and controlling air quality in an indoor environment, the method comprising steps of:
measuring air quality data of the indoor environment using:
a plurality of indoor sensors in the indoor environment, including:
an indoor volatile organic compound sensor;
an occupancy sensor; and an indoor particle sensor; and
an indoor air sample analyzer in the indoor environment;
measuring air quality data of an outdoor environment using external sensors, an outdoor air sample analyzer, an environment server, an outdoor temperature sensor, and an outdoor healthy air sensor; and
by a processor:
receiving the air quality data of the indoor environment and the outdoor environment;
configuring desired indoor air quality parameters;
controlling operation of: a plurality of indoor filters, a healthy gas storage container containing oxygen, and an air conditioned unit to achieve the desired indoor air quality parameters, based on the air quality data of the indoor environment and the outdoor environment;
detecting an environmental emergency based on the air quality data of the outdoor environment; and
adjusting the operation of: the plurality of indoor filters, the healthy gas storage container containing oxygen, and the air conditioned unit to compensate for the environmental emergency.

2. The method as claimed in claim 1, wherein the step of controlling comprises:
learning a pattern of the air quality data of the indoor environment and the desired indoor air quality parameters using artificial intelligence (AI).

3. The method as claimed in claim 1, wherein the step of controlling comprises:
controlling operation of the air conditioned unit to adjust air flow in the indoor environment.

4. The method as claimed in claim 1, further comprising:
configuring, by a user device, for instructing a system for controlling operation of the plurality of indoor filters, the healthy gas storage container, and the air conditioned unit, to achieve the desired indoor air quality parameters based on the air quality data of the indoor environment.

5. The method as claimed in claim 1, further comprising:
configuring, by a user device, for instructing a system for controlling operation of the plurality of indoor filters, the healthy gas storage container, and the air conditioned unit, to achieve the desired indoor air quality parameters based on the air quality data of the outdoor environment.

6. A system for measuring and controlling air quality in an indoor environment, the system comprising:
a healthy gas storage container containing oxygen;
an air-conditioned unit;
a plurality of indoor filters;
a plurality indoor sensors in an indoor environment, including:
an indoor volatile organic compound sensor;
an occupancy sensor; and
an indoor particle sensor;
an indoor air sample analyzer in the indoor environment and
a processor; and
a memory communicatively coupled to the processor, the memory storing processor executable program instructions, which, on execution, cause the processor to:
receive air quality data of the indoor environment and an outdoor environment, the air quality data of the indoor environment being received from the plurality of indoor sensors, and the indoor air sample analyzer, and the air quality data from the outdoor environment is received from external sensors, an outdoor air sample analyzer, an environment server, an outdoor temperature sensor, and an outdoor healthy air sensor in the outdoor environment;
configure desired indoor air quality parameters;
control operation of the plurality of indoor filters, the healthy gas storage container, and the air-conditioned unit to achieve the desired indoor air quality parameters, based on the air quality data of the indoor environment and the outdoor environment
detect an environmental emergency based on the air quality data of the outdoor environment and
adjust the operation of: the plurality of indoor filters, the healthy gas storage container containing oxygen, and the air conditioned unit to compensate for the environmental emergency.

7. The system as claimed in claim 6, wherein the processor is configured to learn a pattern of the air quality data from the indoor environment and the desired indoor air quality parameters using artificial intelligence (AI).

8. The system as claimed in claim 6, wherein the processor is configured to control operation of the air-conditioned unit to adjust air flow in the indoor environment.

9. The system as claimed in claim 6, further comprising:
a user device communicatively connected to the processor for providing instructions to control operation of the plurality of indoor filters, the healthy gas storage container, and the air conditioned unit, to achieve the desired indoor air quality parameters based on the air quality data of the indoor environment.

10. The system as claimed in claim 6, further comprising:
a user device communicatively connected to the processor for providing instructions to control operation of the plurality of indoor filters, the healthy gas storage container, and the air conditioned unit, to achieve the desired indoor air quality parameters based on the air quality data of the outdoor environment.

* * * * *